United States Patent [19]

Gama et al.

[11] 4,127,444
[45] Nov. 28, 1978

[54] DEVICE FOR THERMAL PROTECTION OF A NUCLEAR REACTOR VESSEL

[75] Inventors: Jean-Michel Gama, Orsay; Lionel Paillard, Cachan, both of France

[73] Assignee: Commissariat a l'Energie Atomique, Paris, France

[21] Appl. No.: 784,561

[22] Filed: Apr. 4, 1977

[30] Foreign Application Priority Data

Apr. 6, 1976 [FR] France .................. 76 09924

[51] Int. Cl.² ............................................. G21C 11/00
[52] U.S. Cl. ........................................ 176/38; 176/87
[58] Field of Search ................ 176/40, 50, 65, 87, 176/38

[56] References Cited

U.S. PATENT DOCUMENTS

| | | | |
|---|---|---|---|
| 3,784,443 | 1/1974 | Vercasson | 176/40 |
| 3,962,032 | 6/1976 | Berniolles et al. | 176/40 |
| 4,032,399 | 6/1977 | Defauchy et al. | 176/87 |

FOREIGN PATENT DOCUMENTS 2,248,583   5/1975   France ........................ 176/65

*Primary Examiner*—Harvey E. Behrend
*Attorney, Agent, or Firm*—Cameron, Kerkam, Sutton, Stowell & Stowell

[57] ABSTRACT

A part of the cold liquid metal which is injected at the base of the reactor core is circulated along the bottom portion of the main reactor vessel and guided by a shell which is concentric with the vessel. A mass of inert gas is trapped within a leak-tight annular chamber above the liquid metal. During reactor operation, the gas pressure is adjusted in order to maintain the gas/liquid metal interface at a substantially constant level and to obtain along the vessel a temperature distribution which ensures limited amplitude of stress variation.

4 Claims, 5 Drawing Figures

DEVICE FOR THERMAL PROTECTION OF A NUCLEAR REACTOR VESSEL

This invention relates to a method and a device for the thermal protection of a nuclear reactor vessel.

In more precise terms, this invention relates to the thermal protection of the vessel of an integrated nuclear reactor which is cooled by a liquid metal, that is, of a reactor in which the entire primary coolant circuit is located within the main vessel.

In order to gain a clearer understanding of the invention, the following description relates to examples of practical application of the device in accordance with the invention, these examples being given by way of explanatory illustration but not in any limiting sense. In this description, reference will be made to the accompanying drawings, wherein.

Figure 1:
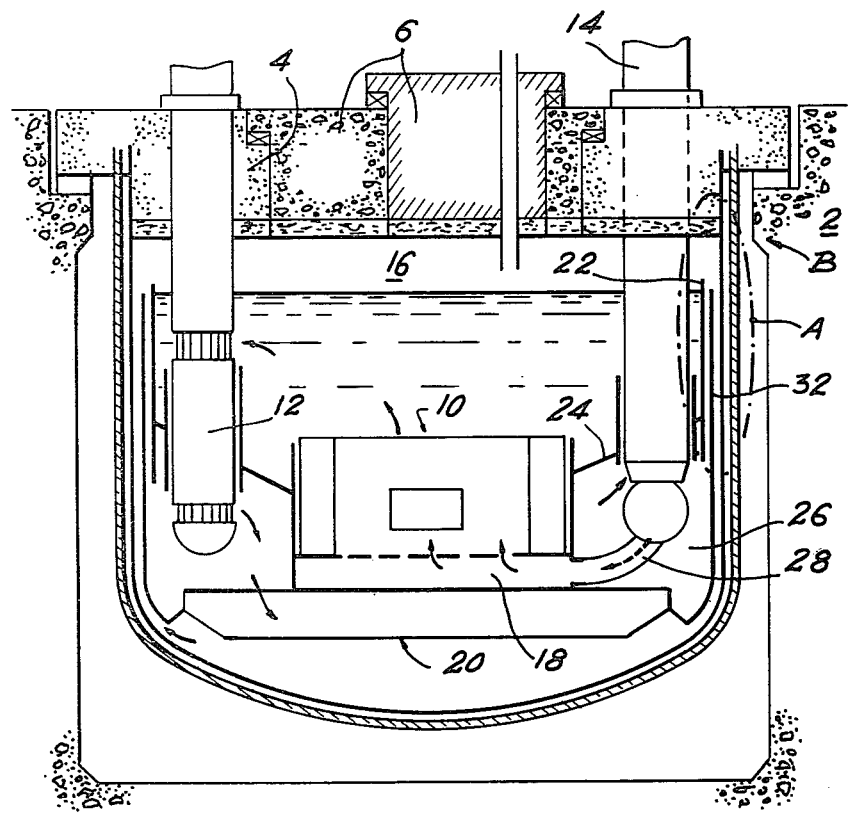
FIG. 1 is a vertical section of prior art construction.
Figure 1A:
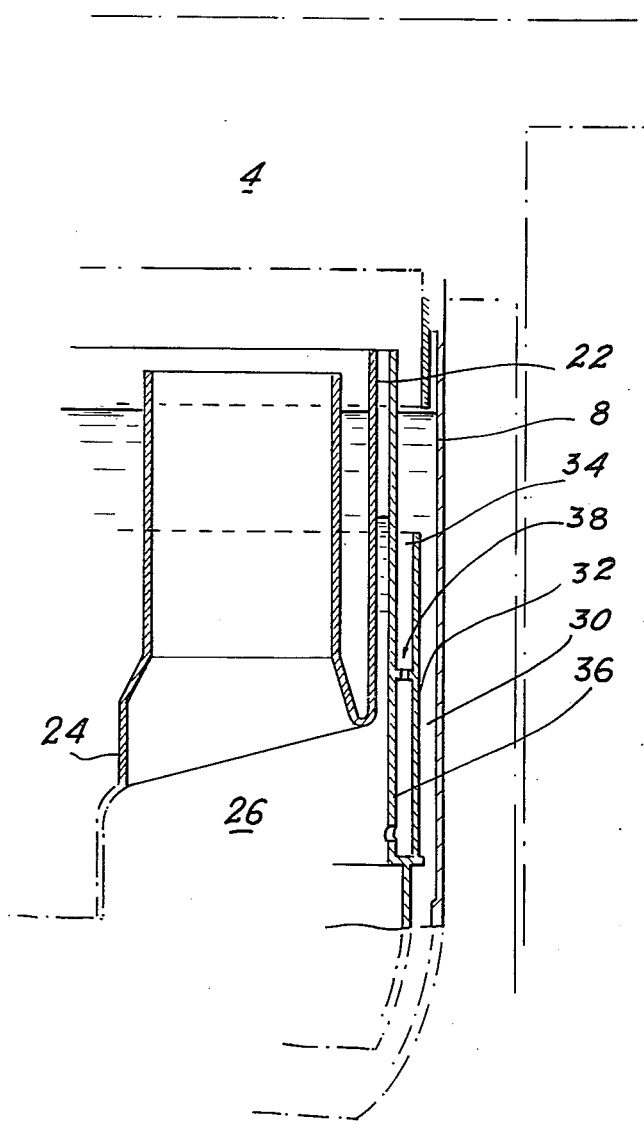
FIG. 1A is a fragmentary vertical section of a prior art construction.

In order to gain a clear understanding of the problem solved by the present invention, reference will be made successively to FIGS. 1 and 1A which illustrate the prior art. FIG. 1 shows diagrammatically in transverse cross-section the main vessel of a fast-neutron integrated reactor and FIG. 1A illustrates a known device for thermal protection of the vessel of a reactor of this type, the device being placed within the portion A of the vessel as shown in FIG. 1.

In FIG. 1, there is shown the concrete containment vault 2 closed by the top shield slab or vault roof 4 in which provision is made for rotating shield plugs such as the plug 6.

The main vessel 8 of the reactor is suspended directly from the vault roof 4. Said vessel 8 contains the reactor core 10 and the entire primary circuit for the circulation of liquid metal coolant together with the heat exchangers of the circuit as designated by the reference 12 and the primary circulating pumps as designated by the reference 14. Provision is made at the top of the main vessel 8 for a blanket 16 of inert gas under pressure. The reactor core 10 is constituted by fuel assemblies inserted at the lower ends thereof in the diagrid 18, said diagrid being intended to rest on a support grid 20 carried by the main vessel 8.

Within the interior of the main vessel 8, the hot liquid metal is separated from the cold liquid metal by the shell 22 which is extended by the frusto-conical shell 24. Thus the hot liquid metal is contained within the shell 22 which constitutes the primary vessel whilst the cold liquid metal is contained within the space 26 referred-to as the intervessel space formed between said shells 22, 24, the main vessel 8 and the support grid 20.

The liquid metal flows through the fuel assemblies of the reactor core 10 in the upward direction, is discharged in the hot state into the primary vessel 22, then escapes through the heat exchangers such as 12. The cold liquid metal then passes out of the heat exchangers into the intervessel space 26 from which it is drawn by the primary pumps 14 and discharged into the diagrid 18 via the duct 28.

The main vessel 8 which supports the entire structure is subjected to very substantial thermal gradients since the liquid metal contained therein is at a high temperature with respect to the temperature of that portion of said vessel which is not wetted by the sodium.

The main vessel 8 is protected thermally in a known manner by means of the cold sodium produced by leakages from the grid 20 which supports the reactor core 10. This flow of cold sodium is circulated along said vessel 8 by means of a shell 32 which is joined to said support grid 20.

As shown in FIG. 1A which represents the prior art, it is apparent that the circuit provided for the liquid metal which is circulated along the main vessel 8 usually has two annular passages 30, 34 formed by means of two concentric shells 32, 36 interposed between the main vessel 8 and the primary vessel 22, diaphragms 38 being usually placed within the passage 34 through which the liquid metal returns downwards into the intervessel space 26.

At certain operating regimes of the reactor, a layer of stagnant liquid metal above the free end of the shell 32 is obtained in a circuit of the type described above for the protection of the vessel 8. Said liquid metal layer undergoes a rapid temperature rise when the level of the liquid metal is established within the intervessel space 26 at a point located above the upper end of said shell 32, taking into account the pressure drop introduced by the heat exchangers 12 and the diaphragms 38.

It is also known that, in the case of a circuit of the above-mentioned type for the protection of the main vessel 8, various design solutions have been contemplated for preventing either the formation of the stagnant liquid layer aforesaid or an increase in temperature of this latter by maintaining the level of liquid metal of the intervessel space 26 below the upper end of the shell 32 by means of a pressure of inert gas.

However, all the solutions which have been adopted prior to the present invention call for complex structures and fail to provide satisfactory control over stresses of thermal origin which are produced along the vessel 8 at the time of reactor power variations, and in particular:

sufficiently rapid start-up emergency shutdown partial permanent operating regimes.

The present invention is precisely directed to a method and a device for thermal protection of a reactor vessel which avoid the need for the complex structures mentioned above.

In accordance with the invention, the method of thermal protection of the main vessel of an integrated nuclear reactor containing the reactor core which is cooled by a liquid metal essentially consists in circulating along the bottom portion of the main vessel a part of the cold liquid metal which is injected at the base of the reactor core by guiding said liquid metal along the main vessel by means of a shell which is concentric with said vessel and in trapping a mass of inert gas within a leak-tight annular chamber which surmounts the liquid metal located between said vessel and said shell, the pressure of said inert gas being adjusted during reactor operation in order to obtain along said vessel a temperature distribution such as to ensure limited amplitude of stress variation.

In accordance with a first alternative embodiment of the invention, the method of thermal protection of the main vessel of a nuclear reactor containing the reactor core which is cooled by a liquid metal essentially consists in circulating along the bottom portion of the main vessel a part of the cold liquid metal which is injected at the base of the reactor core by guiding said liquid metal along the main vessel by means of a shell which is concentric with said vessel and in trapping a mass of inert gas within a leak-tight annular chamber which surmounts the liquid metal located between said vessel and said shell, the pressure of said inert gas being adjusted during reactor operation in order to maintain the gas/liquid metal interface within said chamber at a substantially constant level during operation and to obtain along said vessel a temperature distribution such as to ensure limited amplitude of stress variation.

Thus in accordance with this alternative embodiment, the stresses established at a given point of the vessel have a constant sign during reactor operation and their amplitude of variation is consequently limited.

It should be noted that, in this alternative embodiment, a mass of gas is preferably trapped at the time of reactor start-up under an initial pressure such as to obtain self-regulation of the level of the gas/liquid metal interface within said chamber at the time of run-up to rated power of the reactor. Accordingly, external regulation of the level of said interface is necessary only at the time of a decrease in reactor power.

In accordance with a second alternative embodiment of the invention, the method of thermal protection of the main vessel of a nuclear reactor containing the reactor core which is cooled by a liquid metal essentially consists in circulating along the bottom portion of the main vessel a part of the cold liquid metal which is injected at the base of the reactor core by guiding said liquid metal along the main vessel and in trapping a mass of inert gas within a leak-tight annular chamber which surmounts the liquid metal located between said vessel and said shell, the pressure of said inert gas being adjusted during reactor operation in order to produce a displacement of the gas/liquid metal interface within said chamber during operation in such a manner as to ensure that the thermal gradient established along said vessel is maintained substantially constant in order to obtain along said vessel a temperature distribution such as to ensure limited amplitude of stress variation.

Thus, by virtue of a suitable regulation of the pressure of said mass of gas, the stresses established at a given instant during reactor operation and at a given point of said vessel are maintained at low values and their amplitude of variation is consequently limited.

In accordance with the invention, the inert gas which is trapped within said chamber preferably consists of argon.

The invention further relates to a device for cooling the vessel of a fast-neutron reactor and carrying out the method described in the foregoing.

In accordance with the invention, the device for thermal protection of the main vessel of a nuclear reactor containing the reactor core which is mounted on a support and cooled by a liquid metal essentially comprises:

in the lower portion of said vessel, an annular passage for circulating a part of the liquid metal which is injected at the base of the reactor core, said passage being delimited by the vessel wall and a shell joined to the reactor core support, in the upper portion of the vessel, an annular chamber located above the liquid metal within said passage, said chamber being delimited by the vessel wall and a shell supported by the reactor vault roof or the top portion of said vessel and being filled with a mass of inert gas, means for controlling the level of the gas/liquid metal interface within said chamber during reactor operation, means for adjusting the pressure of said mass of trapped gas within said chamber during reactor operation.

The advantage of the device as characterized in the foregoing lies in the fact that provision is made for only one shell between the main vessel and the primary vessel and in that it is not necessary to instal diaphragms.

In accordance with the invention, the top portion of said chamber is preferably provided with openings for inlets of pipes fitted with valves for controlling and regulating the pressure of said mass of inert gas. Furthermore, a system of any known type for continuously measuring the level of the gas/liquid metal interface is placed within said chamber. This view corresponds to that portion in which the device in accordance with the invention is located.

There is again shown in this figure the reactor vault roof 4, the main vessel 8 which is suspended from said roof and the primary pump 14 which is located within said vessel and extends through the frusto-conical shell 24. Said pump 14 is provided with its skirt 40, the upper portion of which is located within the primary vessel 22 and the lower portion of which is located within the intervessel space 26.

The upper portion of said pump 14 is contained within the interior of a chimney 42, the base of which is attached to the frusto-conical shell 24.

It is recalled that the most advantageous liquid metal for this type of integrated fast reactor is liquid sodium.

In accordance with the present invention, the circuit for the liquid sodium which is circulated along the main vessel 8 is constituted on the one hand by the passage 30 which is formed between the main vessel 8 and the shell 32 and through which the cold sodium flows upwards as a result of leakages from the support grid 20 and, on the other hand, by the passage 46 formed between said shell 32 and the extension 48 of the shell 22 beneath the frusto-conical shell 24.

It is worthy of note that the passage 46 aforesaid corresponds to the upper portion of the intervessel space 26 and that the extension 48 of the shell 22 performs the function of the shell 36 of FIG. 1A. It can be observed in addition that said passage 46 communicates with the intervessel space 26 by means of orifices 50 as in the case of the passage 34 of FIG. 1A. The absence of diaphragms 38 within the passage 46 can also be noted.

Figure 2:
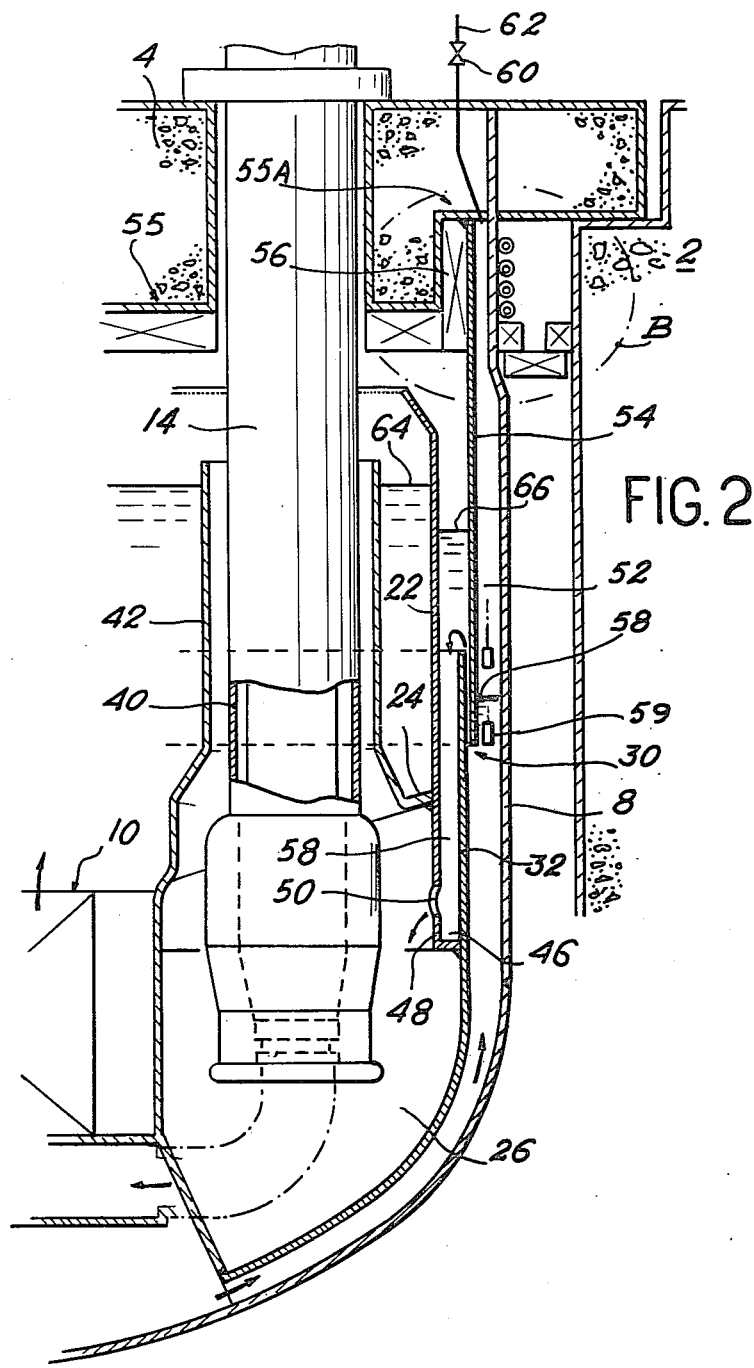
FIG. 2 is a fragmentary vertical sectional view of an embodiment of the device in accordance with the invention wherein the shell which defines the annular chamber is joined to the reactor vault roof in leaktight manner in a plane located above the base of this latter.

The essential feature of the device in accordance with the invention lies in the fact that the cold sodium contained in said passage 30 is surmounted by a leak-tight annular chamber 52 formed by means of a shell 54 which, as will become apparent hereinafter, can be supported either by the vault roof 4 whose walls are covered with a sheet metal lining 55 or by the top portion of said vessel 8. Said shell 54 can be provided with a downward extension beneath the upper end of said shell 32 in order to maintain a gas barrier between the hot sodium and the main vessel in all cases. In accordance with the form of construction of the device in accordance with the invention as shown diagrammatically in FIG. 2, it can be seen that said shell 54 is joined to said sheet metal lining in leak-tight manner at 55A, that is to say on the right-hand side of the heat-insulation packing 56 in a plane located above the base of the reactor vault roof 4.

A mass of gas having very low heat conductivity such as argon, for example, is trapped within said chamber 52. As will become apparent hereinafter, the pressure of said mass of gas is adjusted during operation of the reactor so as to adjust the level of the gas/liquid metal interface 58 within said chamber 52 in such a manner as to obtain along said vessel 8 a temperature distribution which limits the amplitude of variation of stresses.

Provision is made at the top of said chamber 52 for a certain number of pipes such as the pipe 60 which are uniformly spaced on the periphery of said chamber and open into a common manifold outside the reactor.

Each pipe 60 is fitted with a valve 62 for controlling and adjusting the pressure of the mass of gas within said chamber 52.

Moreover, there is placed within said chamber 52 a measuring system of known type which is capable of permitting continuous measurement of the level of the interface 58 within the chamber 52. By way of example, a system of this type can be equipped with level detectors such as the detector 59.

Before describing the operation of the device in accordance with the invention, it should be explained that, at the time of an increase in reactor power, the temperature rise which produces an increase in the pressure of argon and the starting-up of the pumps 14 have a tendency to produce a reduction in level of the argon/liquid sodium interface 58 within the chamber 52. On the other hand, at the time of a decrease in reactor power, the temperature drop and the slowing-down of the pumps 14 have a tendency to cause the level of said interface 58 to rise.

Thus, as a result of a suitable adjustment of the argon pressure within the chamber 52 carried out by means of valves 62 while taking into account the level of the interface 58 as indicated by the detectors 59, the design function of the device in accordance with the invention is to make it possible during reactor operation to maintain the interface 58 at a constant level or to produce a given decrease in this latter, this being achieved irrespective of the aforesaid natural variations in level of said interface 58.

Two modes of execution of the method in accordance with the invention by means of the device described in the foregoing will now be given by way of explanatory illustration.

A first mode of execution of the method in accordance with the invention consists in adjusting during reactor operation the pressure of the mass of gas which is trapped within the chamber 52 in order to maintain the argon/liquid metal interface 58 at a substantially constant level, this being carried out in the following manner.

At the moment of start-up of the reactor, a mass of argon is preferably trapped within the chamber 52 under an initial pressure such that the argon/metal interface 58 is located substantially at the level of the lower end of the shell 54, said pressure being of the order of 1.2 bar.

Thus at the time of run-up to the rated reactor power, there is obtained self-regulation of the level of the interface 58 resulting from a transfer of argon by "bubbling" from the chamber 52 to the gas blanket 16, the effect of this transfer being to stabilize the pressure which exists within said chamber 52. In the case of approach to full reactor power corresponding to an increase in temperature of the sodium from approximately 180° C. (start-up) to 545° C. (rated power level), a mass of argon equal to approximately 50% of the mass of argon initially introduced into the chamber 52 passes from this latter into the gas blanket 16.

At the time of reactor shutdown, taking into account the value of the level of the interface 58 as indicated by the detectors 59, the pressure of argon within the chamber 52 is then adjusted by means of the valves 62 in order to maintain said interface 58 at a constant level.

Thus, in the case of reactor shutdown corresponding to a decrease in temperature of the sodium from 545° C. to approximately 250° C., there is introduced into the chamber 52 a quantity of argon equal to that which has passed from the chamber 52 to the gas blanket 16 at the time of run-up to full reactor power.

It can be noted that, by virtue of the control and regulating valves 62, it is possible to overcome any undesirable fluctuation of the level of the interface 58 at any time as well as during approach to full reactor power, the position of said interface 58 during reactor operation being readily checked and controlled by means of said detectors 59.

In accordance with a second mode of execution of the method in accordance with the invention, the pressure of the mass of gas which is trapped within the chamber 52 is adjusted during reactor operation so as to maintain a constant thermal gradient along the vessel 8 in the following manner.

At the moment of start-up of the reactor, a mass of argon is trapped within said chamber 52 under an initial pressure such that the level of the interface 58 is established between the respective ends of the shells 32 and 54.

At the time of any change in operating regime of the reactor, the pressure of the mass of argon within the chamber 52 is then adjusted so as to obtain a downward displacement $\Delta N$ of the level of the interface 58, thus making it possible to maintain a constant thermal gradient along the reactor vessel.

It is pointed out that the value $\Delta N$ of displacement of the level of the interface 58 depends on the nature of the material constituting the vessel 8 and that the minimum position of the level of said interface 58 can in no event be located beneath the lower end of the shell 54.

It is noted that the desired displacement $\Delta N$ of the level of the interface 58 is obtained by means of valves 62 when an undesirable natural variation in level of said interface 58 is detected by means of the detectors 59.

Figure 2A:
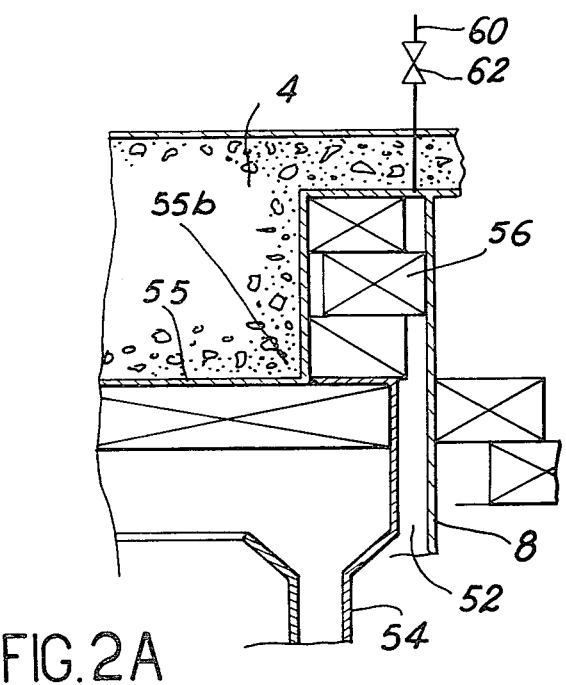
FIG. 2A is a vertical sectional view of the top portion (corresponding to the portion B of FIG. 2) of an embodiment of the device in accordance with the invention wherein the shell which defines the annular chamber is joined to the base of the reactor vault roof in leaktight manner.

In FIG. 2A, there is shown an alternative form of construction of the device according to the invention in which the shell 54 which defines said chamber 52 is joined in leaktight manner to the sheet metal lining at 55B or in other words to the base of the reactor vault roof 4.

Figure 2B:
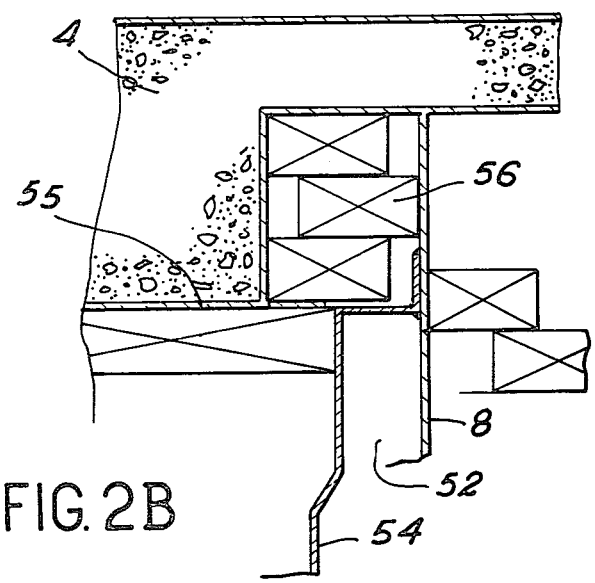
FIG. 2B is a vertical sectional view of the top portion (corresponding to the portion B of FIG. 2) of an embodiment of the device in accordance with the invention wherein the shell which defines the annular chamber is joined to the vessel in leak-tight manner.

In FIG. 2B, there is shown an alternative form of construction of the device according to the invention in which the shell 54 which defines said chamber 52 is joined in leak-tight manner to the top portion of said vessel 8.

As can be readily be understood, the shape of the device described in the foregoing could be modified without thereby departing from the scope or the spirit of the invention.

We claim:

1. A nuclear reactor comprising a principal vessel, a vault roof closing said vessel, a reactor core within said principal vessel, fuel assemblies for said core, a support structure for said fuel assemblies mounted within said principal vessel, a liquid metal coolant for said fuel assemblies circulating through said fuel assemblies from bottom to top thereof, primary heat exchangers receiving heated liquid metal coolant from above said fuel assemblies, a lower zone in the said principal vessel receiving cooled liquid metal coolant from said heat exchangers in an inter-vessel space separated from a zone containing the hot metal by a primary vessel and pump in said principal vessel for circulating cooled liquid metal from said inter-vessel space under pressure to the bottom of said fuel assemblies, the improvement comprising apparatus for thermal protection of said principal vessel including a first shell between said primary vessel and said principal vessel, a lower edge for said shell connected to said support structure for said core, a free upper edge for said shell, a second shell between said first shell and said principal vessel, an upper edge for said second shell connected to said vault roof, a lower free edge for said second shell, the upper free edge of said first shell being located at a level above said lower free edge of said second shell, an annular passage in a lower part of said principal vessel between said first shell and said principal vessel, means for feeding said annular passage with a part of the cooled liquid-metal coolant at the bottom of said fuel assemblies of said core, a sealed annular chamber defined by said second shell and said principal vessel, said chamber surmounting the metal coolant within said annular passage, an inert gas filling said sealed annular chamber, means for controlling during operation of the reactor the level of the interface of liquid-metal coolant and gas in said chamber, and means for adjusting during operation of the reactor the pressure of said gas in said chamber for maintaining substantially constant during operation of the reactor the level of the interface of liquid-metal and gas coolant in said chamber.

2. A nuclear reactor comprising a principal vessel, a vault roof closing said principal vessel, a reactor core within said principal vessel, fuel assemblies for said core, a support structure mounted within said principal vessel supporting said fuel assemblies, a liquid-metal coolant for said core traversing said fuel assemblies from bottom to top, primary heat exchangers in said principal vessel receiving said liquid-metal coolant leaving said fuel assemblies and discharging cooled liquid metal into a lower inter-vessel zone of said principal vessel separated from a zone in said principal vessel containing hot liquid metal by a primary vessel, said cooled liquid-metal coolant being collected in said inter-vessel zone and circulated under pressure by pumps in said principal vessel to the lower part of said fuel assemblies of said core, the improvement comprising apparatus for thermal protection of said principal vessel including a first shell between said primary vessel and said principal vessel, a lower edge for said first shell connected to said support structure for said core, an upper free edge for said first shell, a second shell between said first shell and said principal vessel, an upper edge for said second shell secured to said vault roof, a free lower edge for said second shell, said upper free edge of said first shell being at a level above said lower free edge of said second shell, an annular passage at the lower part of said principal vessel between said first shell and said principal vessel, means for supplying said annular passage with a part of said cooled liquid-metal coolant at the lower part of said fuel assemblies of said core, a sealed annular chamber between said second shell and said principal vessel, said chamber surmounting said cooled liquid-metal coolant in said annular passage, an inert gas filling said sealed annular chamber, means for controlling during operation of the reactor the level of the gas-liquid metal coolant interface in said chamber and means for adjusting during operation of the reactor the pressure of said gas in said chamber to provide during operation of the reactor a displacement of the gas-liquid metal coolant interface in said chamber such that the thermal gradient along said principal vessel is maintained substantially constant.

3. A nuclear reactor comprising a principal vessel, a vault roof closing said principal vessel, a core within said principal vessel, fuel assemblies for said core circulating through said fuel assemblies from bottom to top, primary heat exchangers in said principal vessel receiving hot liquid metal coolant from said fuel assemblies, said heat exchangers discharging cooled liquid metal coolant into a lower inter-vessel zone of said principal vessel separated form a zone in said principal vessel containing hot liquid-metal coolant by a primary vessel, pumps in said principal vessel circulating cooled liquid-metal coolant in said inter-vessel zone under pressure to the lower part of said fuel assemblies, the improvement comprising apparatus for thermal protection of the principal vessel including a first shell between said primary vessel and said principal vessel, a lower edge for said first shell connected to said support structure, an upper free edge for said first shell, a second shell between said first shell and said principal vessel, an upper edge for said second shell secured to an upper part of said principal vessel, a lower free edge for said second shell, said upper free edge of said first shell being above said lower free edge of said second shell, an annular passage in the lower part of said principal vessel between said first shell and said principal vessel, means for feeding said annular passage with a part of the cooled liquid-metal coolant at the lower part of said fuel assemblies, a sealed annular chamber between said second shell and said principal vessel, said chamber surmounting the cooled liquid-metal coolant in said annular passage, an inert gas filling said sealed annular chamber, means for controlling during operation of the reactor the level of the gasliquid metal coolant interface in said chamber and means for adjusting during operation of the reactor the pressure of said gas in said chamber to maintain substantially constant during operation of the reactor the level of the gas-liquid metal coolant interface in said chamber.

4. A nuclear reactor comprising a principal vessel, a vault roof closing said principal vessel, a core within said principal vessel, fuel assemblies for said core, a support structure within said principal vessel for said fuel assemblies, a liquid-metal coolant for said core circulating through said fuel assemblies of said core from bottom to top, primary heat exchangers in said principal vessel receiving hot liquid-metal coolant from above said fuel assemblies and discharging cold liquid-metal coolant into a lower inter-vessel zone of said principal vessel separated from a zone in said principal vessel containing hot liquid-metal coolant by a primary vessel, said cold liquid metal being collected in said inter-vessel zone and circulated under pressure by pumps in said principal vessel to a lower part of said fuel assemblies of said core, the improvement comprising apparatus for thermal protection of said principal vessel including a first shell between said primary vessel and said principal vessel, a lower edge for said first shell connected to said support structure for said core, an upper free edge for said first shell, a second shell between said first shell and said principal vessel, an upper edge for said second shell secured to the upper part of said principal vessel, a lower free edge for said second shell, said upper free edge of said first shell being at a level above said lower free edge of said second shell, an annular passage between a lower part of said principal vessel between said first shell and said principal vessel, means for feeding said annular passage with a part of the cold liquid-metal coolant at the base of said fuel assemblies of said core, a sealed annular chamber defined by said second shell and said principal vessel, said chamber surmounting said cold liquid metal within said annular passage, an inert gas filling said sealed annular chamber, means for controlling during operation of the reactor the level of the gas-liquid metal coolant interface in said chamber and means for adjusting during operation of the reactor the pressure of said gas in said chamber to provide during operation of the reactor a displacement of said gas-liquid metal coolant interface in said chamber to maintain substantially constant the thermal gradient along said principal vessel.

* * * * *